Aug. 25, 1970 T. T. FJÄLLBRANT 3,525,949

ACTIVE RC-FILTER OF A DESIRED DEGREE

Filed April 22, 1968 2 Sheets-Sheet 1

INVENTOR
TORE TORSTENSSON FJÄLLBRANT
BY Hane and Baxley
ATTORNEYS

ACTIVE RC-FILTER OF A DESIRED DEGREE

Filed April 22, 1968 2 Sheets-Sheet 2

INVENTOR
Tore Torstensson Fjällbrant
BY Hane and Baxley
ATTORNEYS

United States Patent Office 3,525,949

Patented Aug. 25, 1970

3,525,949
ACTIVE RC-FILTER OF A DESIRED DEGREE

Tore Torstensson Fjällbrant, Staborg Fjaras, Sweden, assignor to Telefonaktiebolaget L M Ericsson, Stockholm, Sweden, a corporation of Sweden Filed Apr. 22, 1968, Ser. No. 723,094
Claims priority, application Sweden, May 31, 1967, 7,621/67
Int. Cl. H03f *1/36*
U.S. Cl. 330—107 6 Claims

ABSTRACT OF THE DISCLOSURE

An active RC-filter includes a ladder network connected to a signal amplifier. The longitudinal elements of the network which can be either capacitors or resistors connect an input terminal of the filter to the input of the signal amplifier with output of the amplifier being the output of the filter. The transverse elements of the network which can be either resistors or capacitors are connected to a resistor in the output circuit of the amplifier.

The present invention refers to an improvement of the filter stated in the U.S. patent application Ser. No. 691,008. Briefly, that filter comprises an electronic switch element having a low output impedance and an output terminal which is one terminal of the pair of output terminals of the filter. An impedance chain of at least four impedances of a first type which are connected in series between one terminal of a pair of input terminals of the filter and the input of the electronic switch element. The other input and output terminals being connected to each other. The terminal remote from the input of the filter of each of these impedances is connected to one of the terminals of an impedance of a second type which is in phase quadrature with the first type. The impedances of the second type the other terminal of impedances of the second type with even numbers, starting from the switch element, are connected to one output terminal of the filter and those with odd numbers are connected to a tap of resistance connected between one of the pairs of terminals, whereby a filter is obtained having a degree of which is equal to the number impedances of the first type. It appears, however, in practice when assigning the passive components included in the filter, that the component values will vary within very great limits, which is a disadvantage when assembling such filters. An object of the present invention is to eliminate this disadvantage and to obtain a filter having a transfer function which has the same qualities as the filter according to the cited patent, but in which the component values are within closer limits. The invention is characterized in that a number of the impedances with odd numbers of the mentioned second type each are replaced by a circuit consisting of at least one impedance of the mentioned second type whose terminals remote from the mentioned impedance chain are connected to taps of a resistance connected between the output terminals of the filter.

Figure 1:
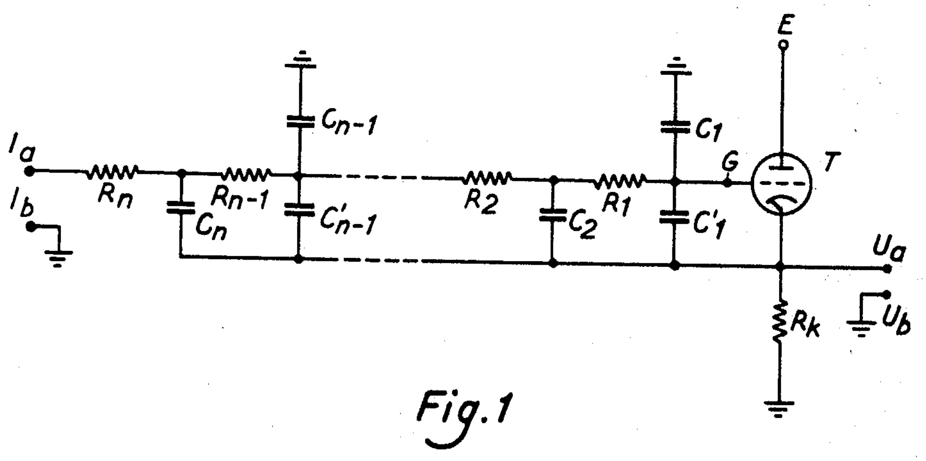
Figure 2:
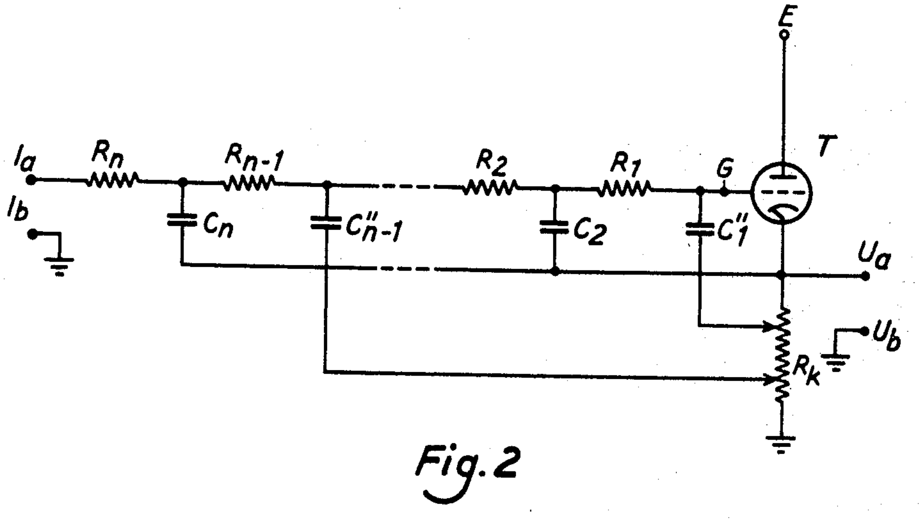
Figure 3:
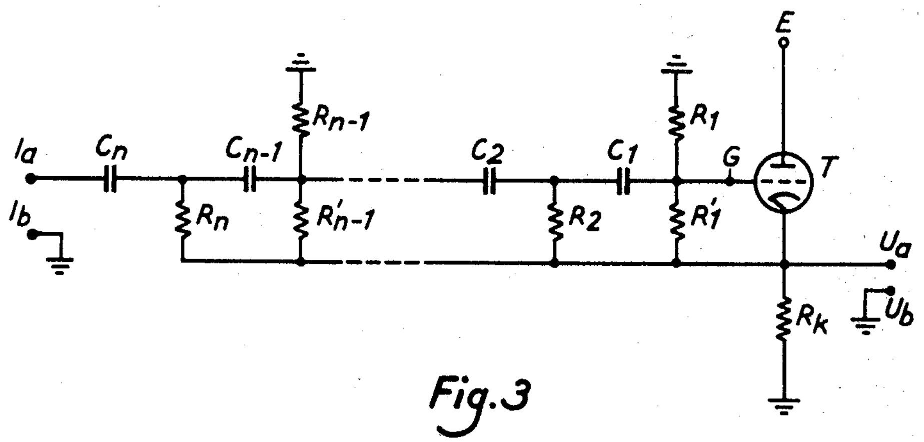
Figure 4:
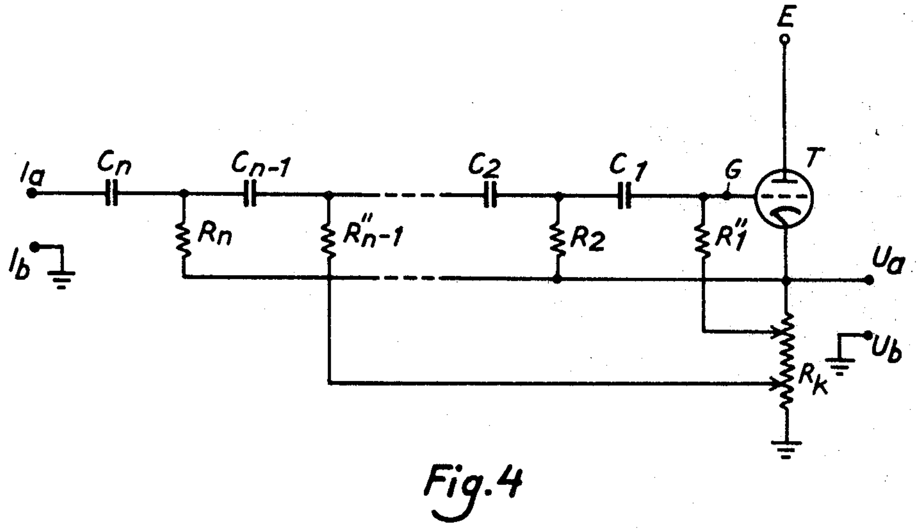

The invention will be described in greater detail in connection with a number of embodiments thereof by making reference to the accompanying drawing in which FIG. 1 shows an improved example of the embodiment of the filter according to FIG. 3 in the patent mentioned, FIG. 2 shows a modified embodiment of the filter according to FIG. 1, FIG. 3 shows a low pass filter which corresponds to a high pass filter according to FIG. 1 and FIG. 4 shows a low pass filter which corresponds to a high pass filter according to FIG. 2.

As described in the cited patent a passive ladder network, which for example includes longitudinal resistances and transverse capacitances, will have a transfer function with a denominator which consists of a sum of polynomials each of which refers to a link in the ladder network. By feeding back every second transverse element, the polynomial, corresponding to the link will thereby disappear from the sum of polynomials. This sum thus gets complex zero points and a filter, which has the same qualities as a filter containing inductances, is obtained.

FIG. 1 shows an example of an active filter according to the invention. This filter is an improvement of the filter according to FIG. 3 in the cited patent, the components in common having the same references. As appears from FIG. 1 one terminal of each of the capacitance $C_1' \ldots C_{n-1}'$, has been connected to the junction points between the capacitances with odd indexes and the impedance chain, the other terminal of which are connected to the first output terminal $U_a$. Thus, feedback is obtained. Accordingly, instead of the polynomial associated with each link disappearing, as is the case of single capacitances connected to the output terminal, the polynomial is multiplied by a factor $$\frac{Y_p'}{Y_p'+Y_p}$$

where $p$ indicates the number of the link, Y indicates the admittance between one impedance chain and ground and Y' the admittance between the impedance chain and the output terminal $U_a$ of the filter (i.e., if at a link $p$ no feedback admittance is connected, $Y_p'=0$ and the corresponding polynomial remains unmodified). In FIG. 1 this factor thus is $$\frac{C_p}{C_p'+C_p}$$

By this reduction of the remaining polynomials whose sum constitutes the denominator in the transfer function of the filter, the coefficients of the sum are changed so that for the realization of the filter a smaller difference is obtained between the values of the passive components than by the realization according to the patent mentioned.

FIG. 2 shows another embodiment of the filter according to FIG. 1. In this embodiment every pair of capacitances with odd indexes is replaced by a capacitance of $(C_1'' \ldots C_{n-1}'')$, which is connected between the impedance chain and a tap of the cathode resistance $Rk$ of the triode T. Accordingly, the polynomials which are associated with the links with odd index numbers, will be reduced in the same way as in the filter according to FIG. 1. The factor of the reduction will be $Rp''/Rk$, where $Rk$ is the value of the cathode resistance and $Rp''$ is the part of the cathode resistance which is between ground and the connecting point of the capacitance. As a matter of fact the same result is obtained as in the filter according to FIG. 1.

FIG. 3 and FIG. 4 show the high pass versions of the filters according to FIG. 1, FIG. 2, respectively, whereby, as known in the prior art, resistances and capacitances have been interchanged.

I claim:

1. An active resistance-reactance filter comprising a pair of input terminals, a pair of output terminals, one of said input terminals being connected to one of said output terminals, an electronic signal amplifier having a signal input and a signal output, said signal output being connected to the other of said output terminals, a resistor connected to said signal output, at least four impedances of a first type serially connecting between said signal input and the other of said input terminals, each of said impedances being assigned a numerical positional significance starting with the impedance connected to said signal input of said electronic signal amplifier being first, at least four impedances of a second type which is in phase quadrature with said first type, each of said four impedances of said second type being connected between the junction of said signal output of said electronic signal amplifier and said resistor and the end, remote from said pair of input terminals, of said impedances of said first type, respectively, and at least two further impedances of said second type, each of said further impedances being connected between the end of said resistor remote from the signal output of said electronic signal amplifier and the end, remote from said pair of input terminals, of said impedances of said first type having odd numerical positional significances, respectively.

2. The filter of claim 1 wherein said impedances of said first type are resistors and said impedances of said second type are capacitors.

3. The filter of claim 1 wherein said impedances of said first type are capacitors and said impedances of said second type are resistors.

4. An active resistance-reactance filter comprising a pair of input terminals, a pair of output terminals, one of said input terminals being connected to one of said output terminals, an electronic signal amplifier having a signal input and a signal output, said signal output being connected to the other of said output terminals, a resistor connected to said signal output, at least four impedances of a first type serially connecting between said signal in put and the other of said input terminals, each of said impedances being assigned a numerical positional significance starting with the impedance connected to said signal input of said electronic signal amplifier being first, at least two impedances of a second type which is in phase quadrature with said first type, each of said impedances of said second type being connected between a tap on said resistor and the end, remote from said pair of input terminals, of the impedances of said first type having an odd numerical positional significance, respectively, and at least two further impedances of said second type, each of said further impedances being connected between the junction of said signal output of said electronic signal amplifier and said resistor and the end, remote from said pair of input terminals, of the impedances of said first type having even numerical positional significance.

5. The filter of claim 4 wherein said impedances of said first type are resistors and said impedances of said second type are capacitors.

6. The filter of claim 4 wherein said impedances of said first type are capacitors and said impedances of said second type are resistors.

References Cited

UNITED STATES PATENTS

| | | | |
|---|---|---|---|
| 2,853,604 | 9/1923 | Campbell | 330—91 X |
| 2,936,426 | 5/1960 | McClean | 330—91 |

ROY LAKE, Primary Examiner

J. B. MULLINS, Assistant Examiner

U.S. Cl. X.R.

330—109.94